United States Patent
Sudharsanan et al.

(10) Patent No.: US 9,367,399 B2
(45) Date of Patent: Jun. 14, 2016

(54) GRAPHICS PROCESSING SUBSYSTEM AND METHOD FOR RECOVERING A VIDEO BASIC INPUT/OUTPUT SYSTEM

(71) Applicant: Nvidia Corporation, Santa Clara, CA (US)

(72) Inventors: Rajagopal Sudharsanan, Pune (IN); Prasad Raghavendra, Pune (IN); Saravanan Sambantham, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 171 days.

(21) Appl. No.: 14/163,737

(22) Filed: Jan. 24, 2014

(65) Prior Publication Data
US 2015/0212890 A1 Jul. 30, 2015

(51) Int. Cl.
*G06F 11/00* (2006.01)
*G06F 11/14* (2006.01)
*G06F 13/16* (2006.01)
*G06T 1/60* (2006.01)
*G09G 5/36* (2006.01)
*G06F 9/44* (2006.01)

(52) U.S. Cl.
CPC .......... *G06F 11/1417* (2013.01); *G06F 9/4403* (2013.01); *G06F 13/1657* (2013.01); *G06T 1/60* (2013.01); *G09G 5/363* (2013.01); *G06F 2211/1097* (2013.01); *G06F 2213/16* (2013.01); *G09G 2360/02* (2013.01); *G09G 2360/06* (2013.01); *G09G 2370/22* (2013.01)

(58) Field of Classification Search
CPC ............ G06F 11/1417; G06F 11/1402; G06F 11/1433; G06F 11/1441; G06F 11/1446; G06F 11/1448; G06F 11/1456; G06F 11/1616; G06F 9/4403; G06F 13/1657; G06F 2211/1097; G06F 2213/16; G06T 1/60; G09G 5/363; G09G 2360/02; G09G 2360/06; G09G 2370/22
USPC ................... 714/5.11, 5.1, 4.5, 10, 15, 23, 44
See application file for complete search history.

(56) References Cited

U.S. PATENT DOCUMENTS

| | | | | |
|---|---|---|---|---|
| 6,081,891 | A * | 6/2000 | Park ..................... | G06F 11/2289 710/10 |
| 7,213,152 | B1 * | 5/2007 | Gafken ..................... | G06F 8/65 713/187 |
| 2006/0015711 | A1 * | 1/2006 | Bang ................... | G06F 11/1417 713/2 |
| 2012/0124358 | A1 * | 5/2012 | Li ........................ | G06F 11/1415 713/2 |
| 2014/0132612 | A1 * | 5/2014 | Schulze ................. | G09G 5/363 345/505 |
| 2015/0205616 | A1 * | 7/2015 | Thai ........................ | G06F 9/463 345/542 |

* cited by examiner

*Primary Examiner* — Joseph D Manoskey

(57) ABSTRACT

A graphics processing subsystem and a method for recovering a video basic input/output system (VBIOS). One embodiment of the graphics processing subsystem includes: (1) a memory configured to store a VBIOS, and (2) a processor coupled to the memory and configured to employ a bridge to gain access to the VBIOS and cause the VBIOS to be written to the memory.

19 Claims, 1 Drawing Sheet

GRAPHICS PROCESSING SUBSYSTEM AND METHOD FOR RECOVERING A VIDEO BASIC INPUT/OUTPUT SYSTEM

TECHNICAL FIELD

This application is directed, in general, to bridged graphics processing subsystems and, more specifically, to using a bridge to automatically recover from a video basic input/output system (VBIOS) failure.

BACKGROUND

A basic input/output system (BIOS) is software built into a computing system (known for this reason as firmware) that is the first software run when the computing system is powered on, or "booted." The BIOS is generally specifically designed for a particular model of computer having particular hardware and chipsets. The BIOS is typically stored on a dedicated non-volatile memory device, where non-volatile refers to the ability to retain stored data when power is removed. BIOS are often stored on read-only memory (ROM), such as an electrically erasable programmable read-only memory (EEPROM), installed on the system motherboard. Some modern computing systems store the BIOS on flash memory, which is a type of EEPROM. Flash memory adds the benefit of being able to load the BIOS to the flash memory without removing the device from the motherboard.

The fundamental purpose of the BIOS is to initialize and test system hardware components and to load other software from other memory, such as a hard drive. Hardware components of concern to the BIOS can include display adapters, audio adapters, communication devices such as network interface cards (NICs) and modems, storage devices, and input devices such as a keyboard, mouse, joystick, hand-held controllers, microphones, and cameras. Some BIOS also provide a layer of abstraction for the hardware components to unify the way applications, the operating system (OS), and other software interact with the hardware. Once initialization and testing of the hardware components are completed, the BIOS typically loads an (OS).

Similar to the BIOS on a computing system, many graphics cards, or "graphics processing subsystems" include a VBIOS. The VBIOS is responsible for initializing and testing hardware components on the graphics processing subsystem and provides a set of functions usable by software programs to access the graphics processing hardware. The VBIOS interfaces the software to the video chipset in the graphics processing subsystem in the same way the system BIOS does for the central processing unit (CPU) in the computing system.

SUMMARY

One aspect provides a graphics processing subsystem. In one embodiment, the subsystem includes: (1) a memory configured to store a video basic input/output system (VBIOS), and (2) a processor coupled to the memory and configured to employ a bridge to gain access to the VBIOS and cause the VBIOS to be written to the memory.

Another aspect provides a method of recovering a VBIOS. In one embodiment, the method includes: (1) executing the VBIOS on a first graphics processing subsystem communicably coupled to a second graphics processing subsystem by a bridge, (2) gaining access to the VBIOS via the bridge, and (3) storing the VBIOS on the second graphics processing subsystem.

Yet another aspect provides a computing system. In one embodiment, the system includes: (1) a plurality of graphics processing subsystems having respective memory configured to store a VBIOS, and (2) a bridge communicably coupling the plurality of graphics processing subsystems, over which the VBIOS is duplicable among the respective memory.

BRIEF DESCRIPTION

Reference is now made to the following descriptions taken in conjunction with the accompanying drawings, in which.

DETAILED DESCRIPTION

Figure 1:
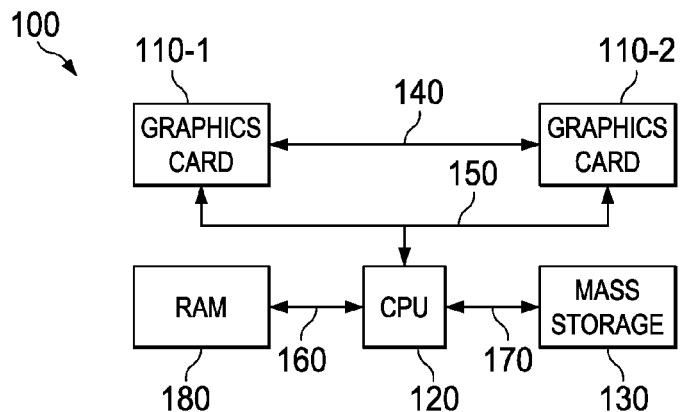
FIG. 1 is a block diagram of one embodiment of a computing system.

In early computing systems, BIOS were typically stored on ROM devices soldered to the motherboard. Upgrading or replacing the BIOS generally meant replacing the BIOS ROM chip, or at least removing the ROM, placing it in a separate system, and flashing the updated or new BIOS to the ROM. As flash memory developed, the ROM devices began to phase out in favor of flash devices that allow easier maintenance since they are writable in-place. The disadvantage of writable flash BIOS memory is that they present a risk to the computing system. A flash BIOS is subject to accidental and intentional corruption, leaving the computing system crippled.

As in system BIOS, VBIOS can require occasional updates, which generally involves overwriting the existing VBIOS with a new VBIOS. If the process of writing the new VBIOS to the VBIOS memory device fails, it is referred to as a VBIOS failure. A VBIOS failure can be cause by a variety of events, including a loss of power during the write cycle, loss of connection to the VBIOS memory device during the write cycle, writing an incorrect version or wrong VBIOS altogether, and others. The consequence of a VBIOS failure is that the graphics processing subsystem cannot operate, which often results in blank displays. Without displays, the VBIOS and graphics processing subsystem are very difficult to troubleshoot. A common solution is to remove the graphics processing subsystem from the disabled computing system and install it into a working system, where the VBIOS can be recovered. This recovery process is far from convenient and often requires specialized systems and tools.

Certain computing systems utilize multiple graphics processing subsystems to better handle high graphics processing loads sometimes generated by applications. The multiple graphics processing subsystems are linked, or communicably coupled by a bridge connection. The bridge is a dedicated data bus that allows the multiple graphics processing subsystems to communicate directly. The bridge can include a cable or a circuit board with a set of traces having connectors on opposing ends that mate with a bridge interface on each of the graphics processing subsystems. To be communicably coupled, the graphics processing subsystems should be connected by some medium through which data signals may pass from one to the other. For example, copper traces or copper wires can communicably couple the two. Two devices may also be communicably coupled by an optical connection, such as an optical fiber.

One embodiment of a bridge is the scalable link interface (SLI) bridge developed by NVIDIA Corporation of Santa Clara, Calif. The SLI bridge allows multiple graphics processing subsystems to operate in parallel to produce a single video output. The SLI bridge is used to reduce bandwidth constraints on a given graphics processor and as a medium for high bandwidth data transfers among graphics processing subsystems. For further details on the bridge and possible embodiments thereof, refer to U.S. Pat. No. 7,412,554, U.S. Pat. No. 7,562,174, and U.S. Pat. No. 7,500,041, each commonly assigned with this application and incorporated herein by reference.

It is realized herein that the bridge between two graphics processing subsystems can be used to automatically recover from a VBIOS failure. In the event of a VBIOS failure, the VBIOS can be recovered from another graphics processing subsystem running the appropriate VBIOS. It is realized herein that the interface for the bridge, such as the SLI bridge, can be expanded to allow for the transfer of the VBIOS from the VBIOS memory of the working graphics processing subsystem to the VBIOS memory of the failed graphics processing subsystem. Once the VBIOS is written to the VBIOS memory, the failed graphics processing subsystem can boot accordingly. It is also realized herein that the recovery process can initiate automatically upon the VBIOS failure. Additionally, the recovery process can be initiated by a keystroke from the user. This automated VBIOS recovery process simplifies the VBIOS recovery procedure and eliminates the need for additional tools or support to otherwise recover the VBIOS.

FIG. 1 is a block diagram of one embodiment of a computing system 100. Computing system 100 includes two graphics processing subsystems: a graphics card 110-1 and a graphics card 110-2 communicably coupled by a bridge 140. Computing system 100 also includes a CPU 120, mass storage 130, and random access memory (RAM) 180. CPU 120, graphics card 110-1, and graphics card 110-2 are communicably coupled by a data bus 150. Data bus 150 is a motherboard-level interconnect for linking motherboard-mounted peripherals, such as graphics processing subsystems. There are a variety of possible embodiments of data bus 150, including: peripheral component interconnect (PCI), PCI Express, PCI Extended (PCI-X), accelerated graphics port (AGP), and others. A CPU 120 is also communicably coupled to RAM 180 by a CPU bus 160 and to mass storage 130 by a computer bus 170. There are a variety of possible embodiment of computer bus 170, including: advanced technology attachment (ATA), Serial ATA (SATA), external SATA (eSATA), parallel ATA (PATA), small computer system interface (SCSI), integrated drive electronics (IDE).

CPU 120 is operable to gain access to mass storage 130 over computer bus 170 and retrieve an application. CPU 120 employs RAM 180 via CPU bus 160 to execute the application and generate graphics data and rendering commands for the two graphics processing subsystems. Graphics card 110-1 and graphics card 110-2 are configured to operate on the graphics data and carry out the rendering commands generated by CPU 120 to produce a single video output. CPU 120 communicates with graphics card 110-1 and graphics card 110-2 over data bus 150. Graphics card 110-1 and graphics card 110-2 can communicate with each other via data bus 150 and bridge 140. The rendering commands generated by CPU 120 constitute a processing load for graphics card 110-1 and graphics card 110-2. That processing load is distributed between graphics card 110-1 and graphics card 110-2 such that neither graphics card is overloaded. In certain embodiments, the load is distributed by dividing the frames of a scene to be rendered. The division can be horizontal, creating top and bottom portions; the division can be vertical, creating left and right portions. In other embodiments, each frame is divided into tiles such that respective portions rendered by graphics card 110-1 and graphics card 110-2 are interleaved in the final image. In alternate embodiments, the processing load is distributed by allocating portions of the graphics rendering pipeline among the multiple graphics processing subsystems. The rendering pipeline comprises a variety of renderers, shaders, and other processing modules, each of which adds to the processing load for the graphics processing subsystems. Rather than running two parallel pipelines, certain renderers, shaders, and other processing modules, can be interleaved among the available graphics processing modules. Bridge 140 allows graphics card 110-1 and graphics card 110-2 to communicate directly, as opposed to through data bus 150. As the processing loads for graphics card 110-1 and graphics card 110-2 fluctuate, graphics card 110-1 and graphics card 110-2 use bridge 140 to shift processing tasks from one to the other and to stay synchronized in processing each frame. One embodiment of bridge 140 is the SLI bridge developed by NVIDIA Corporation. Additionally, bridge 140 can be used by either graphics card 110-1 or graphics card 110-2 to auto-recover their respective VBIOS in the event of a VBIOS failure.

Figure 2:
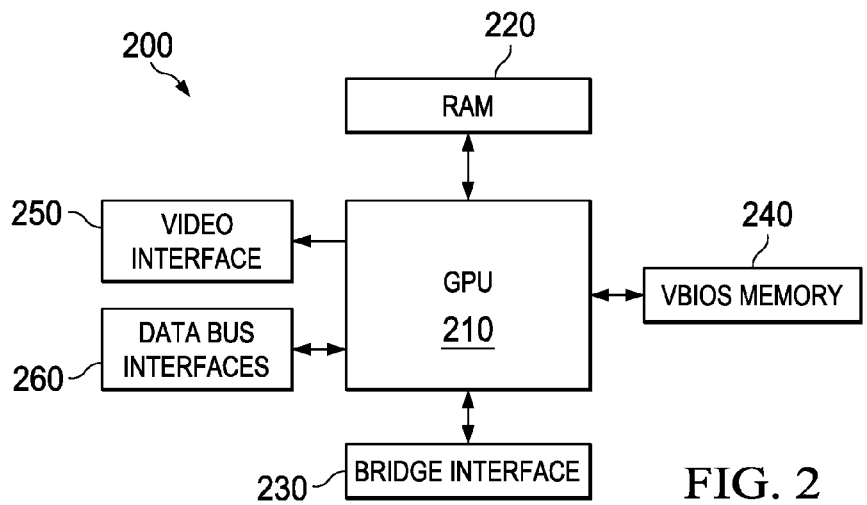
FIG. 2 is a block diagram of one embodiment of a graphics processing subsystem.

FIG. 2 is a block diagram of one embodiment of a graphics processing subsystem 200. Graphics processing subsystem 200 includes a graphics processing unit (GPU) 210, RAM 220, a bridge interface 230, a VBIOS memory 240, a video interface 250, and data bus interfaces 260. Graphics processing subsystem 200 is communicably coupled to a host computing system through data bus interfaces 260. Data bus interfaces 260 can include PCI, PCI Express, PCI-X, AGP, and others. GPU 210 receives rendering commands from the host computing system through data bus interfaces 260 along with graphics data. GPU 210 utilizes RAM 220 to carry out the rendering commands, thereby operating on the received graphics data. RAM 220 is utilized by reading and writing processing results to various blocks of memory within RAM 220. Ultimately, a rendered frame is generated and transmitted from graphics processing subsystem 200 through video interface 250. Possible embodiments of video interface 250 include digital visual interface (DVI), high-definition multimedia interface (HDMI), display port (DP), video graphics array (VGA), and others. VBIOS memory 240 is a dedicated memory for storing a VBIOS for graphics processing subsystem 200. The VBIOS is generally designed for the particular hardware components of graphics processing subsystem 200, including its various chipsets, such as GPU 210. Upon boot-up, GPU 210 loads and executes the VBIOS from VBIOS memory 240. Occasionally, the VBIOS stored on VBIOS memory 240 requires an update, which generally includes overwriting the existing VBIOS with a new VBIOS. In certain embodiments VBIOS memory 240 is a ROM device which can only be updated by removing the ROM device from graphics processing subsystem 200. The VBIOS can then be updated by "flashing" a new VBIOS to the ROM device and re-installing it in graphics processing subsystem 200. In other embodiments, VBIOS memory 240 is a flash memory device that can be written to in-place. In these embodiments, the VBIOS can be updated through a flashing procedure that writes the updated VBIOS to the flash memory device. If the flashing procedure fails, graphics processing subsystem 200 is said to have experience a VBIOS failure. The flashing procedure can fail for a variety of reasons, including loss of power during flashing, loss of connection during flashing, or simply flashing an incorrect or incompatible VBIOS for graphics processing subsystem 200.

Recovering from a VBIOS failure generally requires flashing a new VBIOS to VBIOS memory 240. However, given a VBIOS failure, the display is not operable and the flashing procedure is generally unavailable to the user. In many cases, recovering from a VBIOS failure requires installing graphics processing subsystem 200 in another system configured for such a task. Once a new VBIOS is written to VBIOS memory 240, graphics processing subsystem 200 can be re-installed in the host computing system and booted.

Bridge interface 230 is utilized when graphics processing subsystem 200 is paired with another graphics processing subsystem in the host computing system. Bridge interface 230 allows for direct communication between graphics processing subsystem 200 and the other graphics processing subsystem. Generally, bridge interface 230 provides for transfer of data relating to the rendering processes carried out by the respective GPUs of graphics processing subsystem 200 and the other graphics processing subsystem. Additionally, bridge interface 230 allows for the transfer of the VBIOS to or from VBIOS memory 240 in the event of a VBIOS failure. For example, if graphics processing subsystem 200 experiences a VBIOS failure and is communicably coupled to another graphics processing subsystem via bridge interface 230, the VBIOS from the other graphics processing subsystem can be transferred to graphics processing subsystem 200 over bridge interface 230 and written to VBIOS memory 240. Likewise, if the other graphics processing subsystem experiences a VBIOS failure, the VBIOS running on GPU 210 can be read from VBIOS memory 240, transferred over bridge interface 230, and written to the respective VBIOS memory of the other graphics processing subsystem. This recovery procedure can be automatically initiated upon the VBIOS failure. Also, the recovery procedure can be initiated by a user keystroke.

Figure 3:
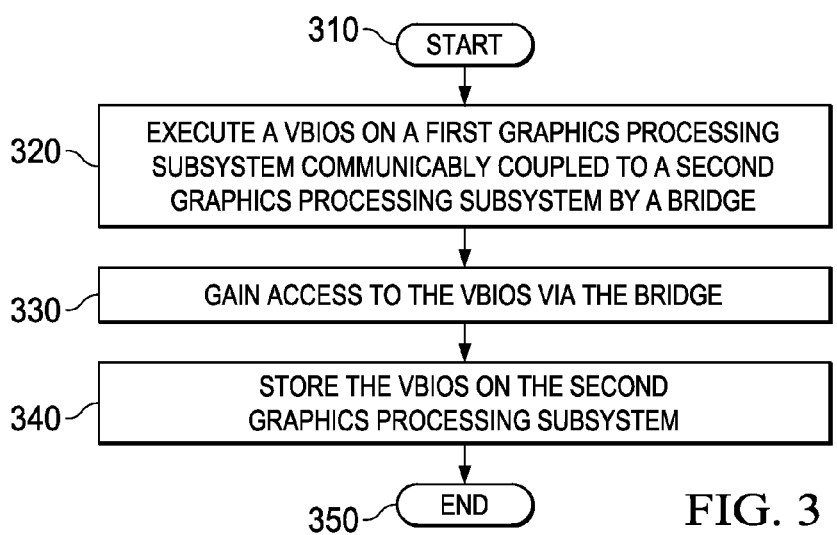
FIG. 3 is a flow diagram of one embodiment of a method for recovering a VBIOS.

FIG. 3 is a flow diagram of one embodiment of a method for recovering a VBIOS. The method begins in a start step 310. In an execution step 320, a first graphics processing subsystem executes the VBIOS. In certain embodiments, the VBIOS is stored on a VBIOS memory device within the first graphics processing subsystem. The first graphics processing subsystem is communicably coupled to a second graphics processing subsystem by a bridge. The bridge links the two graphics processing subsystems, allowing them to communicate directly rather than through a data bus on the host computer system. In certain embodiments, an attempt is made to flash the VBIOS memory device on the second graphics processing subsystem and subsequently fails, leaving the second graphics processing subsystem in a failed state and unable to produce video output. Furthermore, in certain embodiments, the VBIOS failure is detected, possibly initiating the recovery procedure. Continuing the embodiment of FIG. 3, in an accessing step 330, access to the VBIOS on the first graphics processing subsystem is gained through the bridge. The VBIOS is then stored on the second graphics processing subsystem in a storing step 340. The second graphics processing subsystem includes a VBIOS memory device on which the VBIOS from the first graphics processing subsystem is stored. In certain embodiments, accessing step 330 and storing step 340 are initiated automatically upon a VBIOS failure. Additionally, in certain embodiments, the recovery procedure proceeds only upon a user input. For example, given a VBIOS failure, the recovery procedure automatically begins upon the VBIOS failure. However, accessing step 330 and storing step 340 are not undertaken until a keystroke is received from the user.

In certain embodiments, the VBIOS is then executed on the second graphics processing subsystem. The method then ends in an end step 350.

Those skilled in the art to which this application relates will appreciate that other and further additions, deletions, substitutions and modifications may be made to the described embodiments.

What is claimed is:

1. A graphics processing subsystem, comprising:
   a memory configured to store a video basic input/output system (VBIOS); and
   a processor coupled to said memory and configured to employ a bridge to gain access to said VBIOS and cause said VBIOS to be written to said memory, wherein said bridge communicably couples said graphics processing subsystem to another graphics processing subsystem on which said VBIOS is stored.

2. The graphics processing subsystem as recited in claim 1 wherein said bridge is a scalable link interface (SLI) bridge.

3. The graphics processing subsystem as recited in claim 1 wherein said processor is configured to employ said bridge to gain access to said VBIOS upon a VBIOS failure.

4. The graphics processing subsystem as recited in claim 1 wherein said processor is further configured to gain access to said memory and execute said VBIOS.

5. The graphics processing subsystem as recited in claim 1 wherein said memory is a flash memory.

6. The graphics processing subsystem as recited in claim 1 wherein said processor is a graphics processing unit (GPU).

7. A method of recovering a video basic input/output system (VBIOS), comprising:
   executing said VBIOS on a first graphics processing subsystem communicably coupled to a second graphics processing subsystem by a bridge;
   gaining access to said VBIOS via said bridge; and
   storing said VBIOS on said second graphics processing subsystem.

8. The method as recited in claim 7 further comprising executing said VBIOS on said second graphics processing system.

9. The method as recited in claim 7 wherein said VBIOS is stored in a memory on said first graphics processing subsystem.

10. The method as recited in claim 7 further comprising failing to store said VBIOS on said second graphics processing subsystem.

11. The method as recited in claim 10 wherein said gaining access is carried out automatically upon said failing.

12. The method as recited in claim 10 wherein said gaining access is carried out upon a user input.

13. The method as recited in claim 10 further comprising detecting said failing.

14. A computing system, comprising:
   a plurality of graphics processing subsystems having respective memory configured to store a video basic input/output system (VBIOS); and
   a bridge communicably coupling said plurality of graphics processing subsystems, over which said VBIOS is duplicable among said respective memory.

15. The computing system as recited in claim 14 wherein one of said plurality of graphics processing subsystems is configured to automatically initiate a duplication of said VBIOS from said respective memory of another of said plurality of graphics processing subsystems to said respective memory of said one of said plurality of graphics processing subsystems.

16. The computing system as recited in claim 15 wherein said duplication is initiated upon a VBIOS failure on said one of said plurality of graphics processing subsystems.

17. The computing system as recited in claim 16 wherein said VBIOS failure includes writing an unsuitable VBIOS to said respective memory of said one of said plurality of graphics processing subsystems.

18. The computing system as recited in claim 16 wherein said VBIOS failure includes failing to write said VBIOS to said respective memory of said one of said plurality of graphics processing subsystems.

19. The computing system as recited in claim 14 wherein said bridge is employable to distribute processing tasks among respective processors of said plurality of graphics processing subsystems.

\* \* \* \* \*